(12) United States Patent
Finkelstein et al.

(10) Patent No.: US 10,798,131 B2
(45) Date of Patent: Oct. 6, 2020

(54) UNIVERSAL DATA PRIVACY CONTROL MANAGEMENT SYSTEM

(71) Applicant: Charles Finkelstein Consulting LLC, Woodinville, WA (US)

(72) Inventors: Charles Finkelstein, Woodinville, WA (US); Ethan Finkelstein, Woodinville, WA (US); Inder Singh, Seattle, WA (US)

( * ) Notice: Subject to any disclaimer, the term of this patent is extended or adjusted under 35 U.S.C. 154(b) by 282 days.

(21) Appl. No.: 15/968,003

(22) Filed: May 1, 2018

(65) Prior Publication Data

US 2019/0342336 A1  Nov. 7, 2019

(51) Int. Cl.
| | |
|---|---|
| H04L 29/06 | (2006.01) |
| G06F 21/62 | (2013.01) |
| H04L 29/08 | (2006.01) |
| H04L 9/32 | (2006.01) |

(52) U.S. Cl.
CPC .......... *H04L 63/20* (2013.01); *G06F 21/6245* (2013.01); *H04L 9/3239* (2013.01); *H04L 63/0428* (2013.01); *H04L 67/02* (2013.01); *H04L 2209/38* (2013.01); *H04L 2209/42* (2013.01); *H04L 2209/56* (2013.01)

(58) Field of Classification Search
CPC . H04L 63/20; H04L 2209/42; H04L 2209/56; H04L 9/3239; H04L 67/02; H04L 63/0428; H04L 2209/38; G06F 21/6245; G06Q 30/02
See application file for complete search history.

(56) References Cited

U.S. PATENT DOCUMENTS

| | | | | |
|---|---|---|---|---|
| 7,054,614 | B1* | 5/2006 | Hunzinger | H04M 1/72566 455/411 |
| 10,333,694 | B1* | 6/2019 | Hu | H04L 27/2647 |
| 2007/0093234 | A1* | 4/2007 | Willis | G06F 21/6245 455/410 |
| 2010/0274691 | A1* | 10/2010 | Hammad | G06Q 20/3221 705/30 |

(Continued)

OTHER PUBLICATIONS

Satoshi Nakamoto, Oct. 31, 2009, "Bitcoin: A Peer to Peer Electronic Cash System".*

(Continued)

*Primary Examiner* — Robert B Leung
*Assistant Examiner* — Thomas Ho
(74) *Attorney, Agent, or Firm* — Rowan TELS LLC

(57) ABSTRACT

A universal opt-in/opt-out client allows a user to connect to the APIs for various different sites which have the user's data. The universal client orchestrates opting out on any of the site lists provided by default, or sites which the user selects. The universal client enables the user to select total or partial opt-ins or opt-outs with granular control, on one or more web or decentralized sites, where the user may wish to allow some uses of data and access to data but would also like to restrict others. When a user is calibrating their privacy and data settings, a company or site may provide reasons and incentives for the user to allow access to certain data. This allows users to have simultaneous global control over their personal data while enabling the user to receive compensation for the use of their personal data, and allowing companies to have access to better data.

26 Claims, 9 Drawing Sheets

(56) References Cited

U.S. PATENT DOCUMENTS

| | | | | |
|---|---|---|---|---|
| 2012/0331567 | A1* | 12/2012 | Shelton | G06F 21/6245 |
| | | | | 726/28 |
| 2013/0276136 | A1* | 10/2013 | Goodwin | H04L 67/22 |
| | | | | 726/27 |
| 2013/0347057 | A1* | 12/2013 | Hurwitz | G06F 21/6245 |
| | | | | 726/1 |
| 2014/0090091 | A1* | 3/2014 | Prakash | G06F 21/6245 |
| | | | | 726/30 |
| 2017/0289111 | A1* | 10/2017 | Voell | H04L 63/0435 |
| 2018/0013769 | A1* | 1/2018 | Robinson | G06F 21/554 |
| 2019/0034663 | A1* | 1/2019 | Katikala | H04L 9/0643 |
| 2019/0287325 | A1* | 9/2019 | Paolo | F41A 17/063 |
| 2019/0387000 | A1* | 12/2019 | Zavesky | H04L 41/06 |
| 2019/0392406 | A1* | 12/2019 | Deshpande | G06F 21/64 |
| 2020/0184470 | A1* | 6/2020 | Singh | H04L 63/00 |
| 2020/0204557 | A1* | 6/2020 | Singh | H04L 67/306 |

OTHER PUBLICATIONS

Government Office for Science, Jan. 18, 2016, "Distributed Ledger Technology: beyond block chain. a report by the UK government Chief Science Advisor".*

Thomas et al., Feb. 9, 2016, "A protocol for Interledger Payments" (the Ripple whitepaper).*

Seiguei Popov, Apr. 30, 2018, "The Tangle".*

Jonathan Chester, Mar. 3, 2017, "How the Blockchain will secure your identity online" https://www.forbes.com/sites/jonathanchester/2017/03/03/how-the-blockchain-will-secure-your-online-identity/#6d21f22a5523.*

* cited by examiner

UNIVERSAL DATA PRIVACY CONTROL MANAGEMENT SYSTEM

BACKGROUND

Big data is an important driving force behind the global economy. Having access to data allows companies to provide free and personalized services to people. However, most people are not aware who has their data, what data is, what is being done with it, how to correct it, or how to opt in or out of its use. They are not aware what their data is worth nor how they are compensated for companies' access to their data. Companies make billions of dollars, capturing and selling consumer data. Worldwide, consumer data is estimated to be worth over $230 billion. Today search engines and social networking site know far more about users than most people realize. Sites aggregate information that tells them who users are, what they do, and how they think.

While access to consumer data has allowed companies to make money, these companies sometimes violate policies, get hacked, and are often slow to be compliant with new regulations. There has been rising concern among consumers about their lack of control over personal data. These fears have been compounded by a number of high-profile data breaches. In one instance, the personal data for over 145 million Americans was stolen. There has been an increasing focus on personal data and its link to privacy.

Privacy laws are becoming increasingly focused on protecting user data. The US Federal Trade Commission's consumer protection laws have been evolving to help protect consumer data and give consumers knowledge and control. For example, enabling consumers to see their credit score, is now required for free. Europe and Canada have taken an even more aggressive approach than the United States. The EU passed legislation, most notably, the General Data Protection Regulation (GDPR), with the intent of giving citizens and residents control over their personal data and to simplify the regulatory environment for international business. In Canada, similar privacy-centered legislation has also been enacted.

In order to be compliant with laws like the GDPR, companies are providing basic, single site interfaces where the user may select whether or not they would like to opt-in or out of certain privacy-related features. Despite the value of personal data, and the resources companies devote to obtaining it, a large portion of data harvested is inaccurate. Companies need a better way to give transparency with privacy and content control to consumers around their personal data. Companies want but don't get current, accurate personal data and people want better goods and services while maintaining personal control of their data. There is an increasing need for companies to have an efficient way to obtain user data securely, while allowing the user to opt in or out, manage privacy settings, retain control of data content, and be incentivized for its use.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
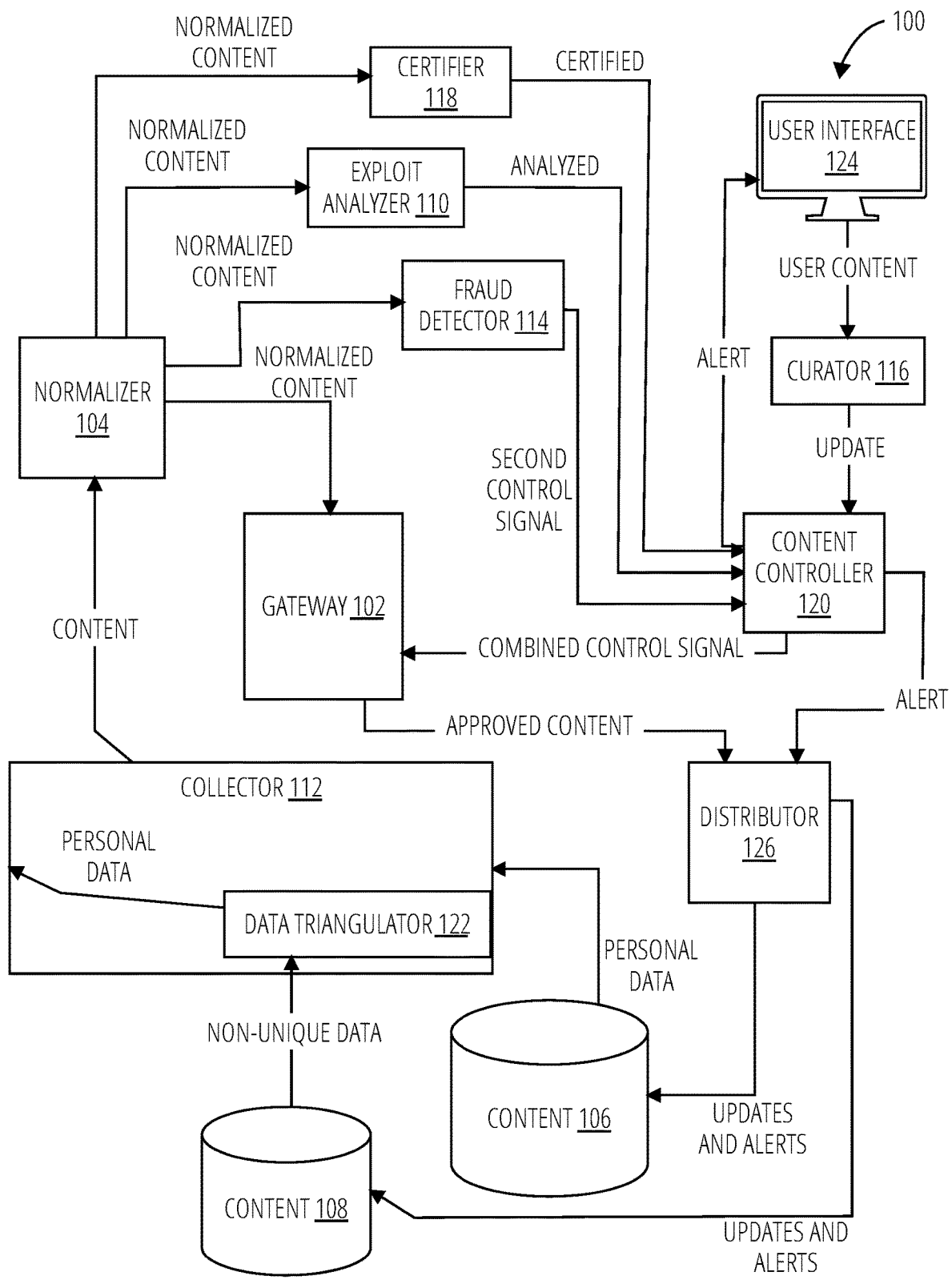
FIG. 1 is a system diagram of an embodiment of a personal data management system 100.

Referring to FIG. 1, a system 100 comprises a gateway 102, a normalizer 104, content 106, content 108, an exploit analyzer 110, a collector 112, a fraud detector 114, a curator 116, a certifier 118, a content controller 120, a data triangulator 122, a user interface 124, and a distributor 126.

The collector 112 receives the content 106 and content 108 and in response collects the content for normalization and distribution to various management modules. Content may be collected into a buffer, for example a FIFO, or may be processed immediately, or may be buffered and prioritized for processing according to source. Content sources include local devices (PC, LAN server, tablet, mobile phone, etc.), "cloud" locations, and any source that stores data components representing a person or entity explicitly or in an obfuscated fashion, (e.g. GUID).

Content sources may be accessed utilizing a driver model. The system may include specific data source "connectors" built on generic interfaces that call the most optimal methods for gaining access to the source(s), then collecting/distributing data back. For example, local file and/or database methods with local access controls may be utilized for locally accessible data stores, e.g. mounted file systems. In the case of accessing personal data on a social network, ecommerce site, or financial data warehouse, specific data connectors are built, and loaded, utilizing methods such as REST, JSON, SOAP, Protocol Buffers, and others as appropriate to verify credentials, collect content, distribute updates, etc. Some sources may require subscriptions or some other secure method to access; for example a person may pay also store personal information such as financial accounts and passwords in an encrypted removable device, such as to make it virtually un-hackable.

In some embodiments, a collector 112 receives a unique human-associated digital identifier from content 106 and transforms it into a digital content. The data triangulator 122 receives a non-unique digital pattern from content 108 and correlates identified data to existing data and transforms a non-unique digital pattern into a unique human-associated digital identifier. The collector 112 transforms personal data signals into a digital content which it transmits to normalizer 104.

The normalizer 104 receives a digital content and transforms it into normalized content by identifying content attributes and standardizing data formatting. Normalization involves mapping data fields having possibly different names or values across different content sources to consistent names or values for analysis and processing by the various management modules. The normalized content is then distributed to the various management modules.

The certifier 118 receives a normalized content from the normalizer 104 and in response transforms it into a content certification and transmits the content certification to the content controller 120. The content controller 120 receives this alert from the certifier 118 and in response maps the alert to the specific form of the source to which it will be provided, such a user interface 124 which presents a person (principle or delegate) with an option to certify the veracity of the content. If the content is validly associated with the person, they may provide an alert indicating its validity. The alert may be passed back to the appropriate content sources which provide an indication that the content is certified by its "owner", that is, the person it is for/about. If the content is not validly associated with the person, a different alert (indicating the content is uncertified) may be generated and passed through to the content sources, which post a corresponding "uncertified" indication for the content.

The exploit analyzer 110 receives a normalized content and in response analyzes the content for exploitation of personal data and transforms it into a first control signal and transmits it to a content controller 120. Exploitation may involve use of personal data for monetary gain, without authorization to do so. Detected exploitation may be reported to the person whose data is being exploited using a machine-human interface. The person may choose to act to end the exploitation by contacting the content source or the person exploiting the content.

The fraud detector 114 receives a normalized content and in response analyzes the content for fraudulent actions and transforms it into a first control signal and transmits it to a content controller 120. Fraudulent activity can include false attribution of the content to a person or entity; false or misleading statements in conjunction with the content; or other use of the content in a fraudulent or misleading manner. If fraud is detected, an alert may be generated for distribution back to the content source. The gateway 102 receives the alert from the fraud detector 114 and in response maps the alert to the specific form of the source to which it will be provided. The distributor 126 receives the alert from the content controller 120 and in response distributes the alert to the appropriate content sources. The content sources 106, 108 receive the content update signal from distributor 126 which may include an alert and in response act on the alert, for example by removing or flagging the corresponding content.

The curator 116 receives user content from a user interface 124 and transforms the digital content into a third control signal and transmits it to content controller 120.

The content controller 120 receives a third control signal, a second control signal, a first control signal, and a content certification, and sends a combined control signal to operate gateway 102 and transmit an enable signal to collector 112.

The content controller 120 receives a third control signal, a second control signal, a first control signal and a content certification and sends an alert to user interface 124 to notify the user of the need for additional action or approval.

The distributor 126 receives an approved content and alert and sends updates and alerts signal to content 106 and content 108.

Figure 2:
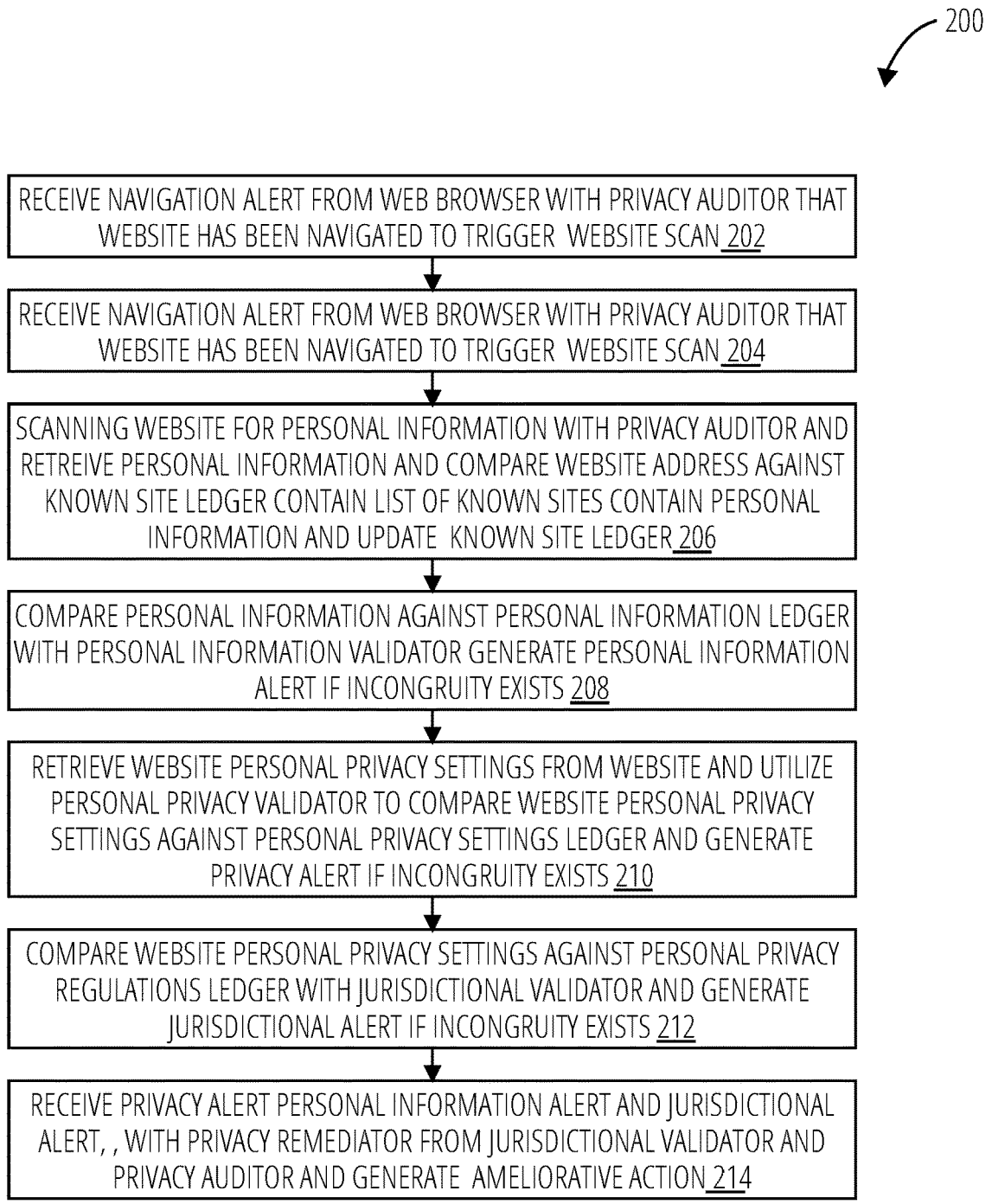
FIG. 2 illustrates a process for managing personal data 200 in accordance with one embodiment.

Referring to FIG. 2, a process for managing personal data 200 receives a navigation alert from a web browser with a privacy auditor that a website has been navigated to, triggers a website scan (block 202).

The process for managing personal data 200 scans the website for personal information with the privacy auditor, and retrieves the personal information and compares the website address against a known site ledger contains a list of known sites contains the personal information, and updates the known site ledger (block 204).

The process for managing personal data 200 compares the personal information against a personal information ledger with a personal information validator, and generates a personal information alert if an incongruity exists (block 206).

The process for managing personal data 200 retrieves website personal privacy settings from the website or distributed application, and utilizes a personal privacy validator to compare the website personal privacy settings against a personal privacy settings ledger, and generates a privacy alert if an incongruity exists (block 208).

The process for managing personal data 200 compares the website personal privacy settings against a personal privacy regulations ledger with a jurisdictional validator, and generates a jurisdictional alert if an incongruity exists (block 210).

The process for managing personal data 200 and receives the privacy alert the personal information alert and the jurisdictional alert, with a privacy remediator from the jurisdictional validator and the privacy auditor, and generates an ameliorative action (block 212).

Figure 3:
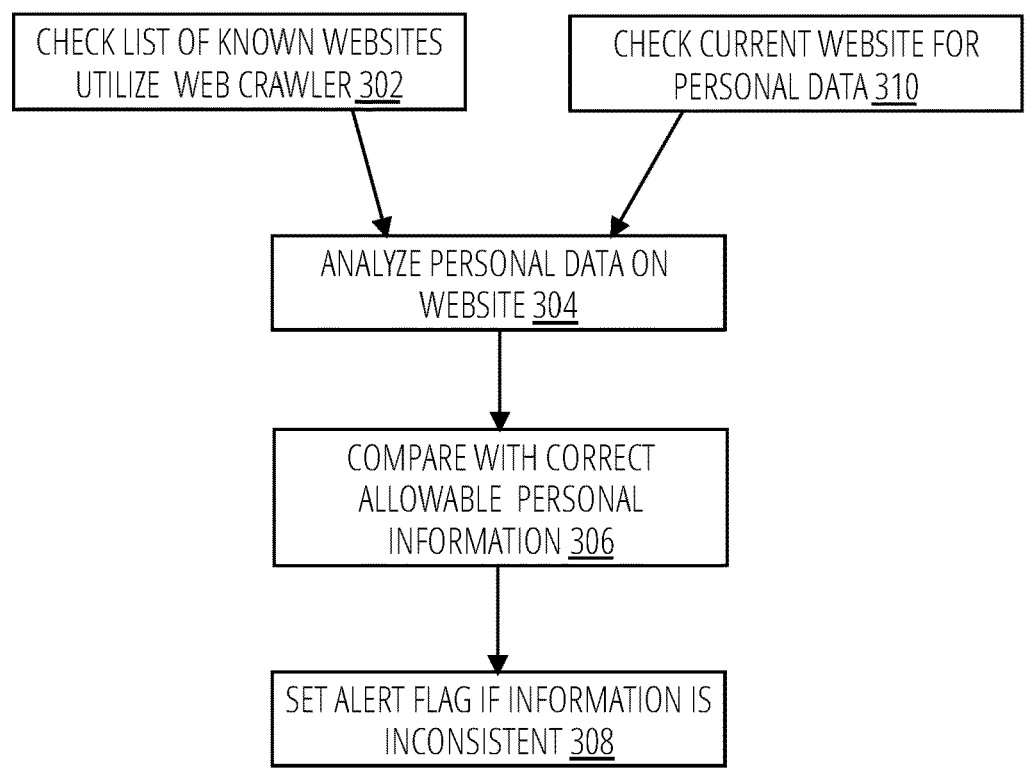
FIG. 3 illustrates a process for managing ID health 300 in accordance with one embodiment.

Referring to FIG. 3, a process for managing ID health 300 checks the current website for personal data (block 302). The process for managing ID health 300 utilizes a browser to check a list of known websites (block 304). The process for managing ID health 300 analyzes personal data on the website (block 306), and compares the personal data on the website with correct and allowable personal information (block 308). An alert flag is set if the information is inconsistent (block 310).

A system may utilize this process to monitor the users identity health (ID health) by monitoring outlets with the user's personal information and looking for any inconsistency with the user's actual data, in which case the system will generate an alert. The system may batch scan known sites and may also crawl websites and distributed applications, and may also utilize a central repository with an API to allow companies to request verification of identification. For example, a credit card company may receive a request for a new credit card from a person using the user's information. The credit card company could transmit information to the system via a secure connection for verification, and in the event that the request was false, the system may generate an alert to the credit card company as well as recording the attempt and notifying the user. The system may monitor user information posted on the Internet and look for known issues. For example, the system may use a blacklist of sites and interactions that that have known to corrupt identity, and may intervene if any of those sites come up in the record of data use.

The system may also utilize blockchain to record transactions in an immutable ledger. For example, user privacy settings may be recorded on the blockchain with time and date stamps. The blockchain may also enable a self-sovereign ID, which may begin as a global unique user ID (GUID) with various levels of attestations upon it, such as a user's certified social security number, certified driver's license, or certified passport, as well as professional certifications. The user may make changes to their personal settings, where the user opts out of certain settings which would become a transaction on the blockchain, and any future transactions that switch it back would be recorded on the blockchain as well. The system may monitor these transactions and look for inconsistencies that indicate that the user's identity has been compromised. The system may also record on the ledger times/dates that information within the ledger was accessed. A user may use the system's app or browser extension to record on the block chain that some that the user's personal information was read from a particular site or distributed application.

Companies may update their privacy policies to be in compliance with laws, for example the GDPR, so the system may periodically query companies for updates of their privacy policy, and updates from governmental agencies on privacy regulations.

For example, the system may alert a company administrator that a privacy policy has been affected by a regulation change so that the administrator could check to see how it affects the business rules and alter the company's privacy policy.

The system may employ a validator in forms that may include blockchain smart contracts to compare privacy settings with current laws, and user preferences and then may execute an action based on that. In the event that an error is found, then the validator may generate an alert notifying the site or user of the potential discrepancy. They system may embody this business rules/legal flows utilizing standard orchestration scripting or blockchain smart contracts well known in the art. The system may also embody these rules and flows in a blockchain which would automatically also record the transaction to a ledger in an immutable way. For example, if a user participates in a transaction, e.g. updating their privacy policy or opt-in/opt-out, this could be verified against the smart contract that the policy was either written manually or auto imported which would ensure that transaction is compliant.

Figure 4:
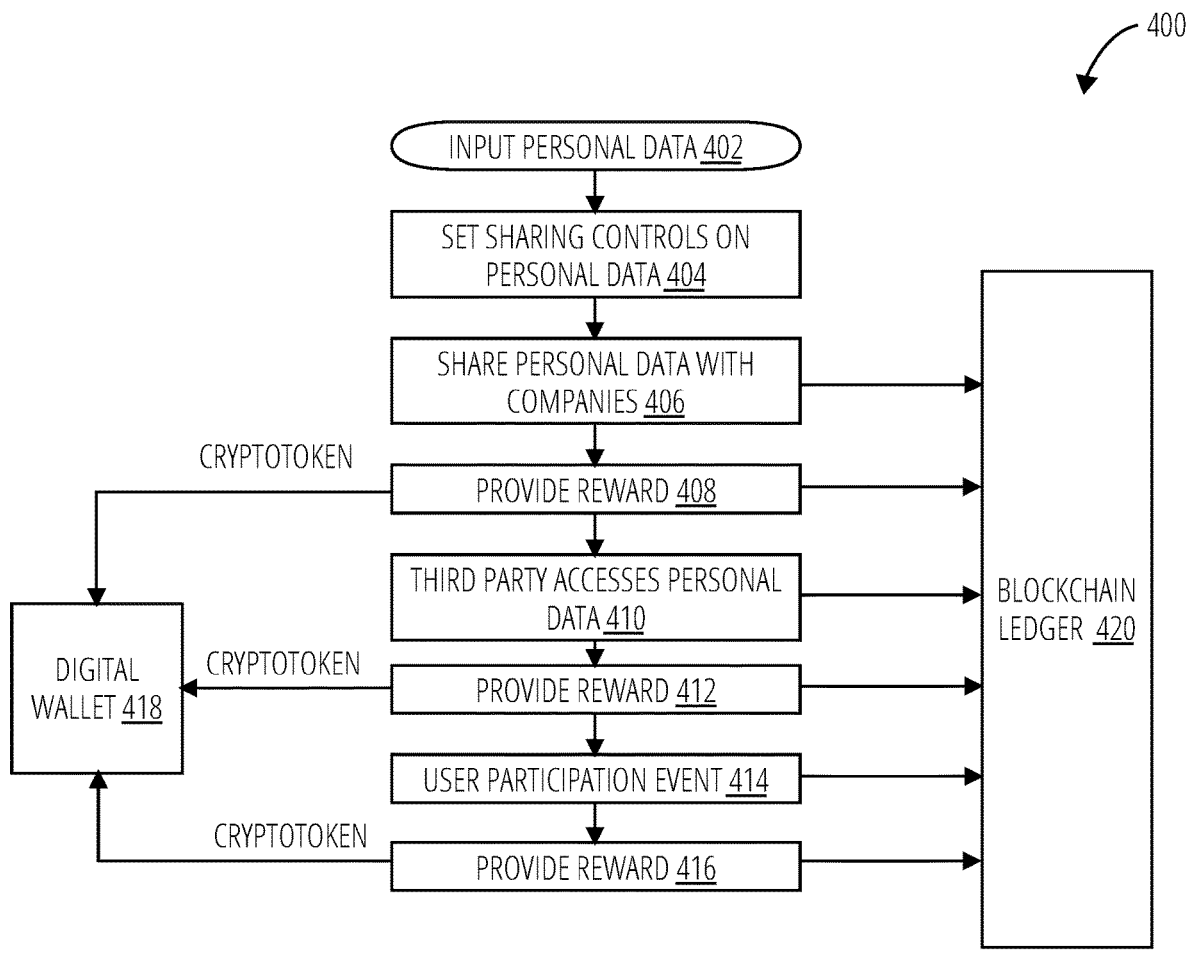
FIG. 4 illustrates a reward and data sharing process 400 in accordance with one embodiment.

Referring to FIG. 4, a reward and data sharing process 400 begins by inputting personal data (block 202) and setting sharing controls on the personal data (block 404).

The reward and data sharing process 400 shares personal data with companies (block 406), and provides a reward via a digital wallet (block 408). The reward and data sharing process 400 provides third party access to the personal data (block 410).

The reward and data sharing process 400 provides a reward via a digital wallet (block 412), initiates a user participation event (block 414), and provides a reward (block 416).

The rewards in block 408, block 412, and block 416 may be deposited in the digital wallet 418 as a cryptotoken. The transactions in block 406, block 408, block 410, block 412, block 414, and block 416, are recorded on the blockchain ledger 420.

Figure 5:
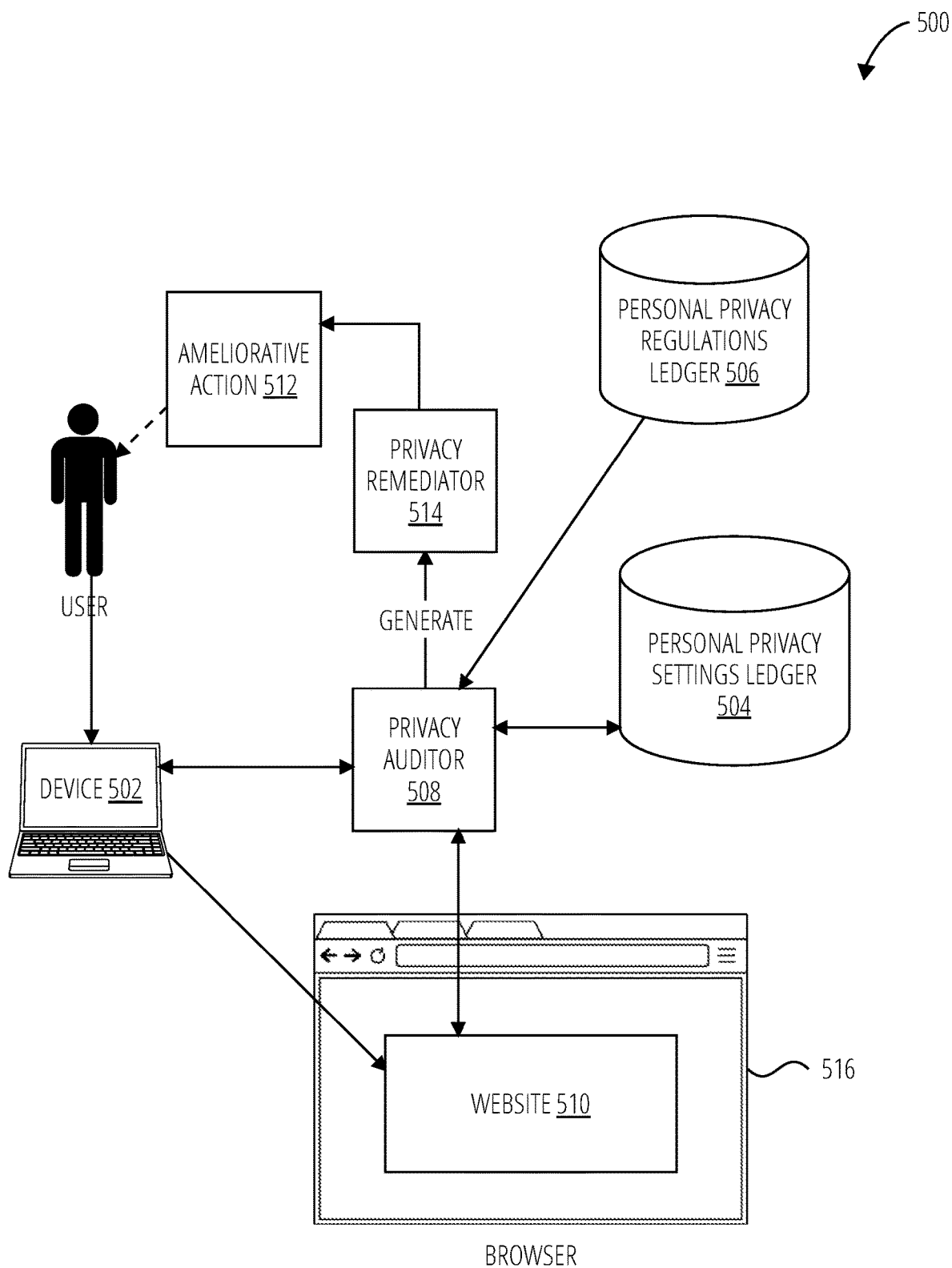
FIG. 5 illustrates a data privacy system 500 in accordance with one embodiment.

Referring now to FIG. 5, a data privacy system 500 comprises a device 502, a personal privacy settings ledger 504, a personal privacy regulations ledger 506, a privacy auditor 508, a website 510, an ameliorative action 512, a privacy remediator 514, and a browser 516.

A universal privacy settings/opt-in/opt-out client allows a user to connect to the APIs for various different sites which have the user's data. The universal client orchestrates curation of privacy settings and overall opting out of any of the sites which the user selects or are provided by default. It allows the user to select total or partial opt-ins or opt-outs where the user has granular control when they may wish to allow some uses of data and access to data but would restrict others. When a user is calibrating their privacy and data settings, a company or site or distributed application may provide reasons and incentives for the user to allow access to certain data. This allows users to have simultaneous global control over their personal data while enabling the user to receive compensation and/or services for the use of their personal data, thus allowing companies to have access to better data. The user may do this by maintaining a universal profile with a personal privacy policy which may be applied to company privacy policies and the system may then automatically resolve where the two are in conflict. Common settings across sites have a unified view and unique settings per site are labeled, with a site identifier. This would allow the user's data and privacy settings to remain consistent across sites, where common data and settings are used and uniquely where required by individual sites. The user may authenticate the system into web sites and decentralized services and authorize its access to the sites utilizing the user's credentials. And where blockchain IDs are used, the system may similarly operate on behavior of the user. For example, after the user has installed the system's user portion, a user may use a mobile device or computer to go to a site or decentralized service, for example, Facebook or Steemit. The first time the user does this, the system may automatically generate a pop-up window or notification and ask the user for their settings, allowing the system to auto configure based on the user's online behavior. This allows the user greater freedom to use the most efficient software for their purpose since the user is not forced to access sites through the system, which runs parallel to, or in the user's browser. The system may run in the background (like a daemon) and monitor sites unobtrusively.

The system may then see that the user accessed a site or decentralized service that had contained the user's personal data. The system may inquire how the user would like to have their data managed on that site. The system may allow the user to also configure when the system is running. The system may for example allow the user to toggle the system off and on or allow the user to set specific instances or sites which should be explicitly included or excluded (i.e. "whitelisted" or "blacklisted"), or may allow the user to "suspend" protection if desired.

When that site or decentralized service is accessed in the future, the system will enforce the privacy settings through the browser or interface used to access that site or it would automatically configure the user's profile. For example, a user's Facebook profile may be automatically configured to reflect the user's preferences for that site or decentralized service.

The system may need to synchronize with privacy settings that the user has changed manually and may as the user to resolve/approve conflicts. When the system connects to the site or decentralized service's privacy settings or opt-in/opt-out settings, the system may evaluate the settings to see if the user had changed any. The system may access a site or decentralized service through an API or more directly through "web scraping" and may employ the user's ID and credentials to gain access. The system may utilize an intermediary to analyze the settings and do a manual translation until the system can gain access to the site. The system may maintain a database of known personal data aggregating sites and may connect to those sites to correct or request removal of personal information depending on the user's settings. The system may also be configured with a country's privacy laws and may monitor information on websites and decentralized services for compliance with both the user's settings as well as the privacy laws of that jurisdiction.

For example, the user may look at some of the settings common to the different sites and employ a translator layer with a portable JSON configuration standard to allow system to easily control privacy across sites and decentralized services.

The system may employ a browser extension to detect that a site was a data miner and may check the user's privacy settings for that site to ensure consistency with either the user's default settings or some special settings the user may have for that particular site, and if the settings on the site were inconsistent with the user's settings, the system would automatically set the sites settings to be consistent, or notify the user and site admin of the inconsistency.

Figure 6:
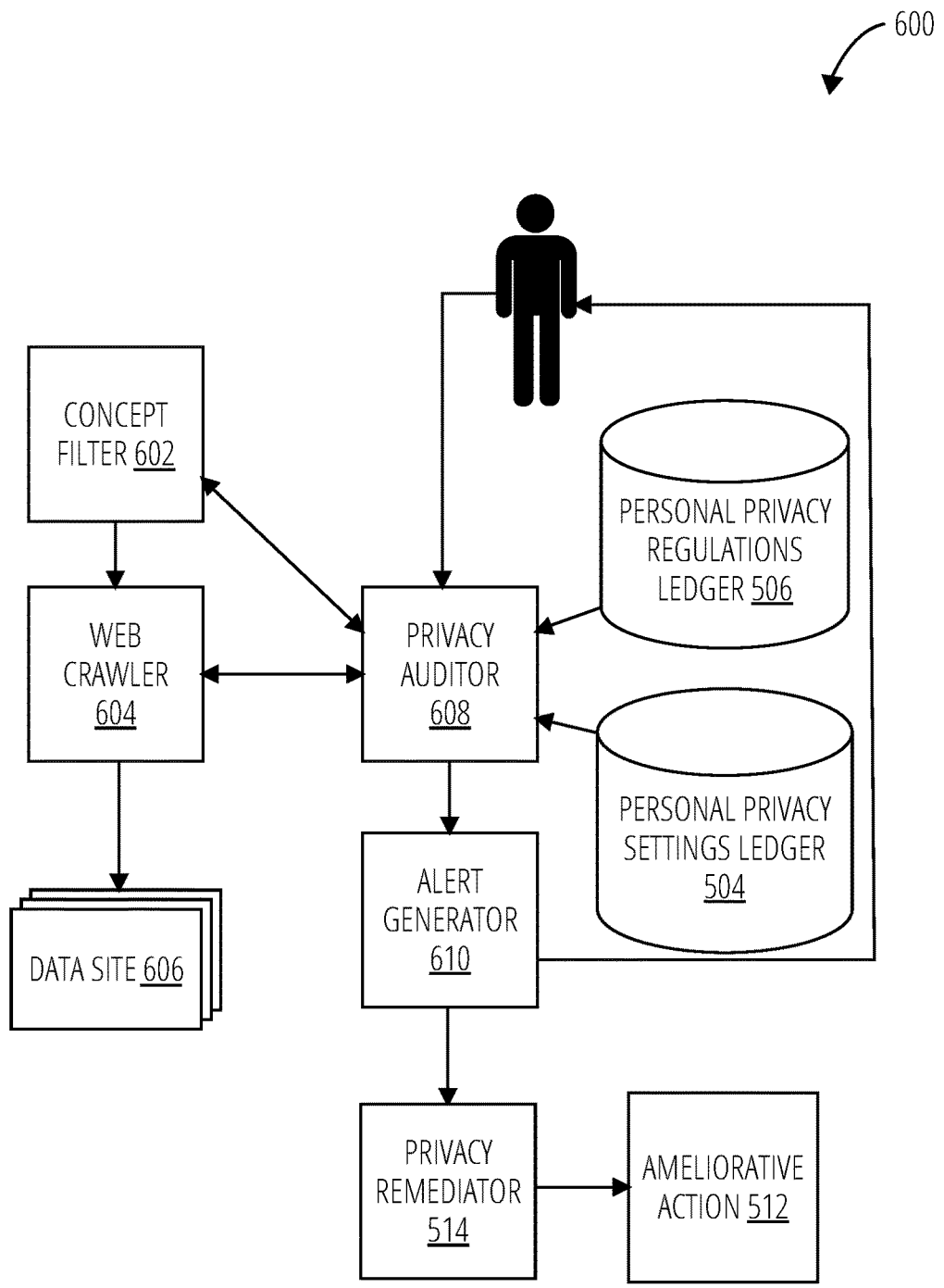
FIG. 6 illustrates a data privacy system 600 in accordance with one embodiment.

Referring to FIG. 6, the data privacy system 600 comprises a personal privacy settings ledger 504, a personal privacy regulations ledger 506, a concept filter 602, browser 604, data site 606, a privacy auditor 608, an alert generator 610, a privacy remediator 514, and an ameliorative action 512. The privacy auditor 608 configures the browser 604 with the concept filter 602 and the browser 604 analyzes the data site 606. The browser 604 detects information on the data site 606, which is not congruent with the personal privacy settings ledger 504, and the personal privacy regulations ledger 506. The browser 604 notifies the privacy auditor 608 and the privacy auditor 608 notifies the privacy remediator 514. The alert generator 610 receives the notification and generates an ameliorative action 512. The ameliorative action 512 may be, for example populating and transmitting a cease and desist form letter or may be accessing the data site 606 via an API and correcting the incongruence. The browser 604 may monitor and "crawl" websites for personal information, and may access and monitor personal information on distributed applications (DApps), for example, a blockchain-based distributed service, site, or application.

The system may monitor a user's data for inconsistencies and inaccuracies, and also to ensure that the level of data shared is not in excess of the user's specified level of sharing. They system may then reduce the amount of data that that is shared to match the user's intention as specified in other parts of the of the client's user interface. For example, on the privacy settings if a user has decided not to share location data, the system may notify the user that they have location turned off and have shared something with location data associated with it. If the system or the user finds information that may have been previously shared on the Internet, but the user no longer wants it to be public, including their current legal rights to have data about them forgotten, the system may send a notification signal to the site or generate a cease-and-desist letter to the site's operator. The system may employ a filter to screen sites for specific information, for example, the user may configure the system to scan their social media pages for embarrassing or inappropriate content. For example, prior to applying for a job, a user may wish to ensure their social media page does not have anything which might appear inappropriate to a potential employer. The system may accomplish this by implementing, for example, a keyword filter or a concept filter.

Figure 7:
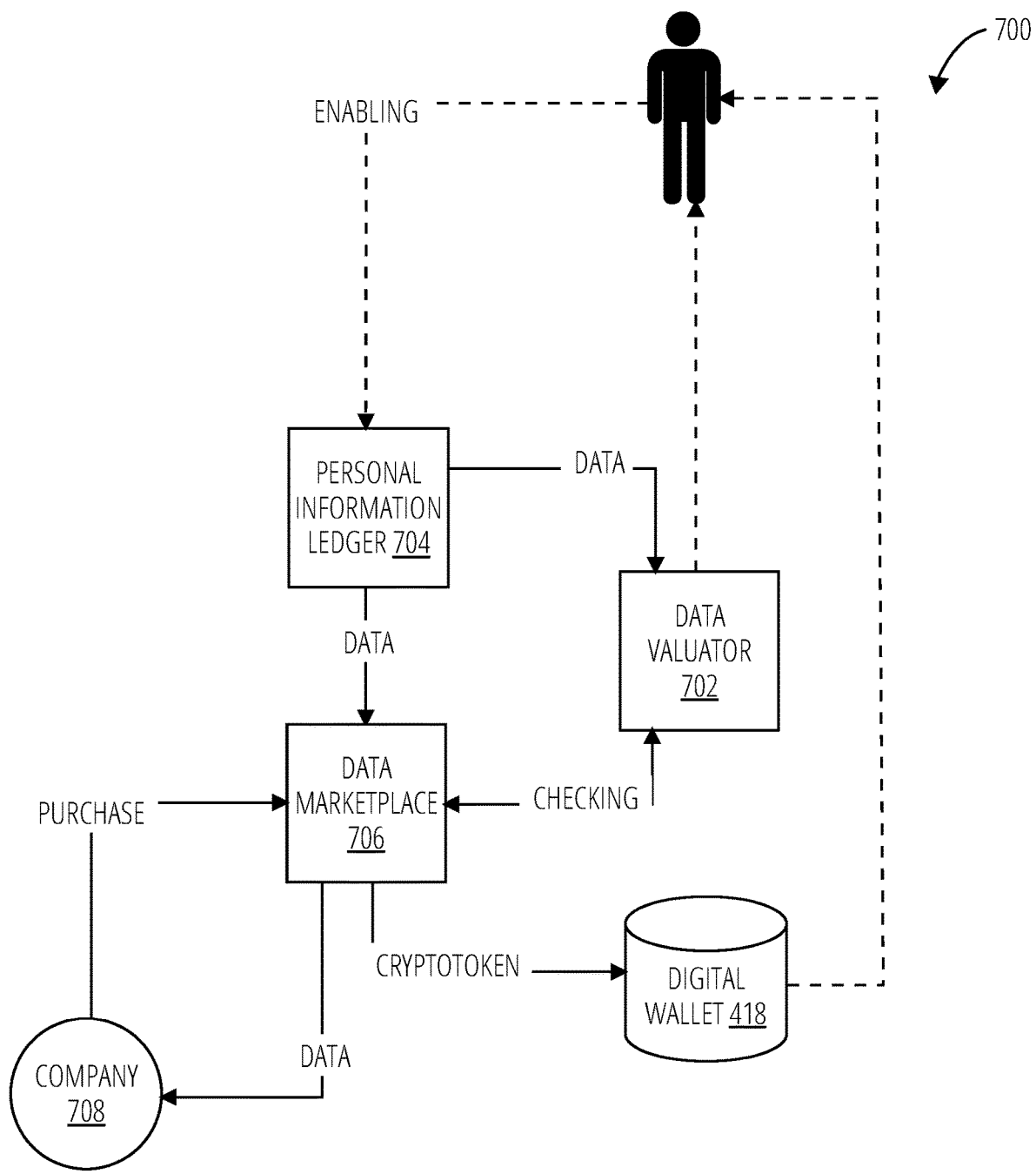
FIG. 7 illustrates a data privacy system 700 in accordance with one embodiment.

Referring now to FIG. 7, a data privacy system 700 comprises a digital wallet 418, a data valuator 702, a personal information ledger 704, a data marketplace 706, and a company 708. The user may enable the data privacy system 700 to transmit data from the personal information ledger 704 to the data marketplace 706. The data valuator 702 may utilize known valuation calculators to provide the user with a value approximation of their data. The personal information ledger 704 may also record market prices for the user's data to provide the user with an actual value. The company 708 may purchase data from the data marketplace 706 and the user may receive a crypto token in a digital wallet 418.

The system enables users to receive compensation for the use of their personal data, and the level of compensation may be determined by the value of the individual's data. For example, a user with more social media followers may be more valuable to a company looking to connect with "influencers," or a different company may be more interested in users who purchase a large quantity of items online in a specific demographic. To establish a value for a user's data, the system may utilize a market where entities may bid on user information. This would allow natural market effects to establish the value of each user's information. Alternatively, the system may utilize commonly known value evaluation techniques. In addition to allowing companies better access to user data, this gives the user a sense of how much their data is worth at any given time—for example, shopping habits, and demographic information. The system may employ conventional data evaluation techniques used in digital advertising. If a user's data is purchased by a company or a data broker, the system may make a deposit into a bank account or crypto wallet. The system may ingest personal data and metadata with fields corresponding to different information. The user may also input their personal data into these fields. The user may then set sharing controls to set the privacy permissions for each piece of data. These may be default controls that can be set individually by site or decentralized application and the controls may indicate the site's identity and what type of site or service it is, for example, news site vs. social media site.

The user may decide to share their personal data with a third party in exchange for a reward, which may be transmitted to the user's digital wallet. The system may employ a distributed ledger or blockchain to record transactional information. The user may also store other data on the blockchain as well. For example, the user may store "binary large objects" AKA BLOBs of data on the blockchain. The user may have opportunities to provide richer forms of data, for additional rewards and incentives, for example, participating in surveys, focus groups referrals, enabling data sharing inferred by certain privacy and opt in settings, etc. The system manages the user's privacy across all sites so regardless of updates to privacy policies, a user's data remains protected and their privacy settings on the social media site maintain parity with the system's privacy settings.

Figure 8:
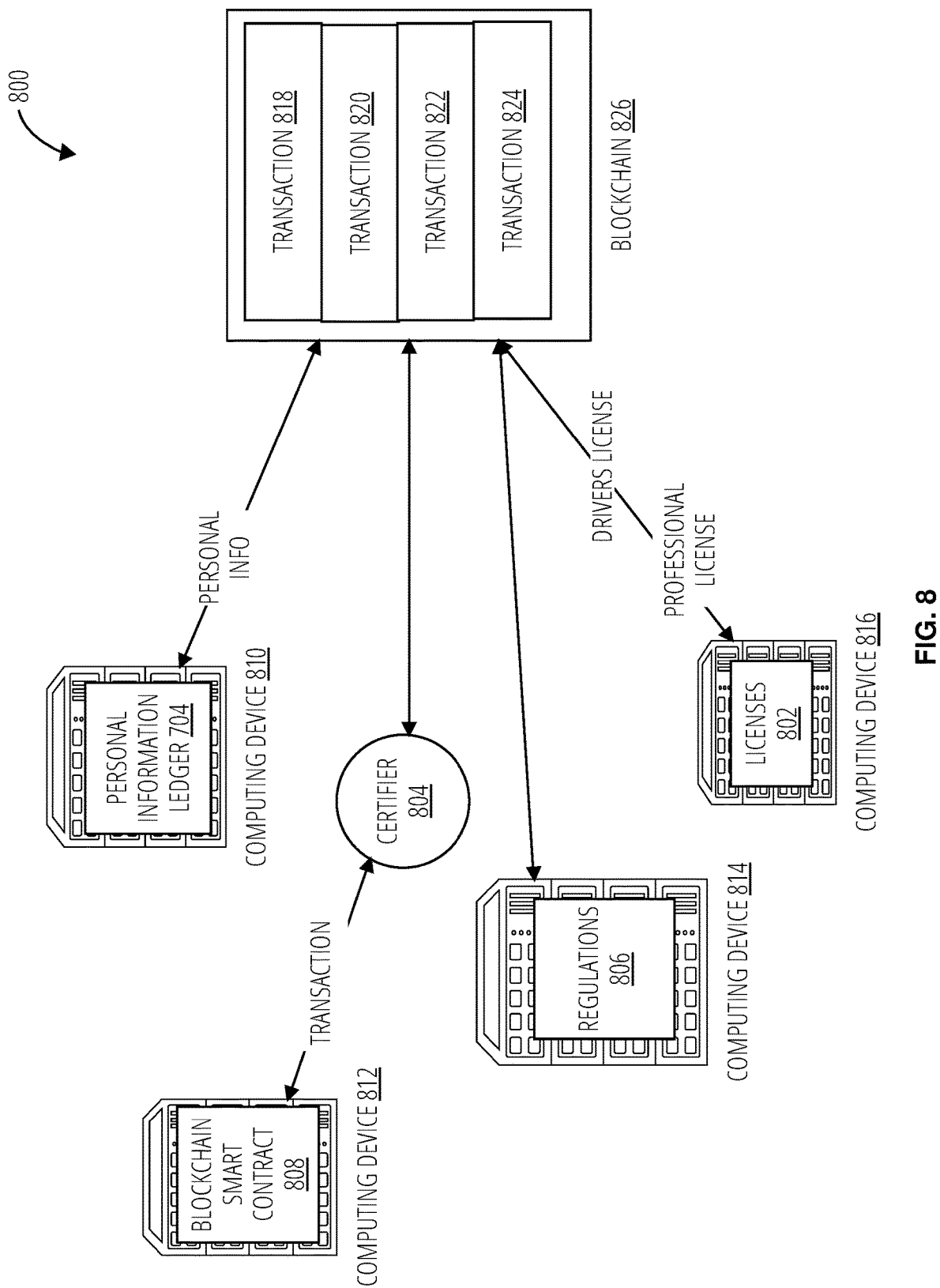
FIG. 8 illustrates blockchain 800 in accordance with one embodiment.

Referring now to FIG. 8, a blockchain 800 comprises a license 802, a certifier 804, a personal information ledger 704, regulations 806, a blockchain smart contract 808, a blockchain smart contract 808, a computing device 810, a computing device 812, a computing device 814, a computing device 816, a transaction 818, a transaction 820, a transaction 822, a transaction 824, and a blockchain 826. The computing device 810 transmits personal information ledger 704 to the blockchain 826. The computing device 812 transmits the blockchain smart contract 808 to the blockchain 826 via the certifier 804.

The computing device 814 records the regulations 806 on the blockchain 826, and the computing device 816 records the licenses 802 on the blockchain 826. The licenses 802, regulations 806, blockchain smart contract 808 and personal information ledger 704 may be recorded on the blockchain 826 as the transaction 818 the transaction 820, the transaction 822, and the transaction 824. The blockchain 826 may be distributed on the computing device 812, the computing device 810, the computing device 816, and the computing device 814.

Figure 9:
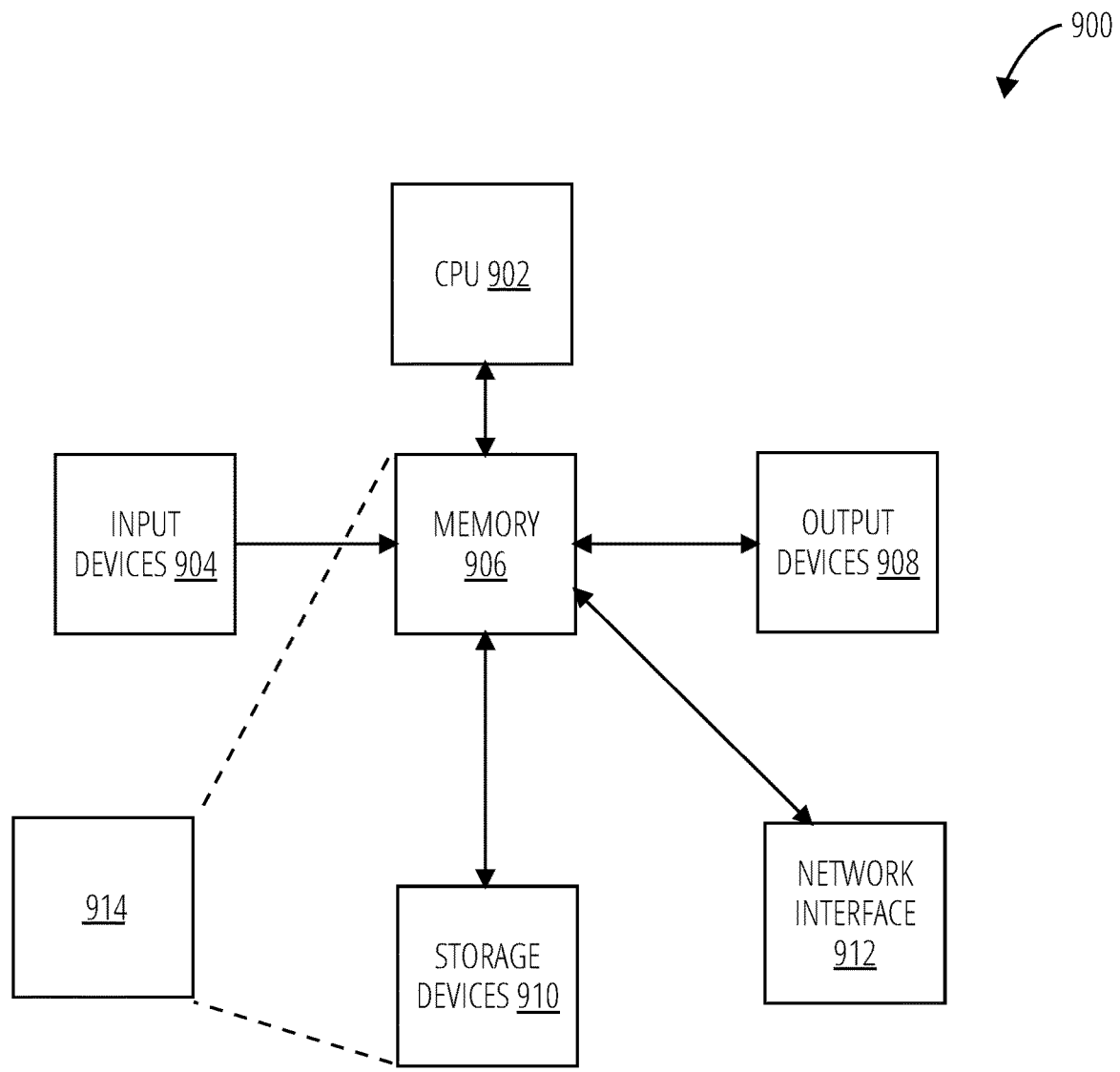
FIG. 9 illustrates a digital apparatus 900 in accordance with one embodiment.

FIG. 9 illustrates an embodiment of a digital apparatus 900 to implement components and process steps of the system described herein.

Input devices 904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 904 are keyboards which respond to touch or physical pressure from an object or proximity of an object to a surface, mice which respond to motion through space or across a plane, microphones which convert vibrations in the medium (typically air) into device signals, scanners which convert optical patterns on two or three-dimensional objects into device signals. The signals from the input devices 904 are provided via various machine signal conductors (e.g., busses or network interfaces) and circuits to memory 906.

The memory 906 is typically what is known as a first or second level memory device, providing for storage (via configuration of matter or states of matter) of signals received from the input devices 904, instructions and information for controlling operation of the CPU 902, and signals from storage devices 910.

The memory 906 and/or the storage devices 910 may store computer-executable instructions and thus forming logic 914 that when applied to and executed by the CPU 902 implement embodiments of the processes disclosed herein.

Information stored in the memory 906 is typically directly accessible to the CPU 902 of the device. Signals input to the device cause the reconfiguration of the internal material/energy state of the memory 906, creating in essence a new machine configuration, influencing the behavior of the digital apparatus 900 by affecting the behavior of the CPU 902 with control signals (instructions) and data provided in conjunction with the control signals.

Second or third level storage devices 910 may provide a slower but higher capacity machine memory capability. Examples of storage devices 910 are hard disks, optical disks, large capacity flash memories or other non-volatile memory technologies, and magnetic memories.

The CPU 902 may cause the configuration of the memory 906 to be altered by signals in storage devices 910. In other words, the CPU 902 may cause data and instructions to be read from storage devices 910 in the memory 906 from which may then influence the operations of CPU 902 as instructions and data signals, and from which it may also be provided to the output devices 908. The CPU 902 may alter the content of the memory 906 by signaling to a machine interface of memory 906 to alter the internal configuration, and then converted signals to the storage devices 910 to alter its material internal configuration. In other words, data and instructions may be backed up from memory 906, which is often volatile, to storage devices 910, which are often non-volatile.

Output devices 908 are transducers which convert signals received from the memory 906 into physical phenomenon such as vibrations in the air, or patterns of light on a machine display, or vibrations (i.e., haptic devices) or patterns of ink or other materials (i.e., printers and 3-D printers).

The network interface 912 receives signals from the memory 906 and converts them into electrical, optical, or wireless signals to other machines, typically via a machine network. The network interface 912 also receives signals from the machine network and converts them into electrical, optical, or wireless signals to the memory 906.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method of managing the authentication and distribution of digital content on a plurality of web sites, the method comprising:
   operating a content controller on a digital network gateway, the content controller responsive to signals from a plurality of authorization control modules;
   wherein the digital network gateway is responsive to a combined authorization signal generated from the signals from the authorization control modules;
   the digital network gateway gating personal information to a digital content distributor;
   the digital content distributor digitally distributing the personal information to the plurality of web sites, wherein the content distributor is configured to inhibit the distribution based on a signal from the content controller;
   receiving a navigation alert from a web browser with a privacy auditor that a website has been navigated to, triggering a website scan;
   scanning the website for the personal information with the privacy auditor, and retrieving the personal information from the website and comparing the website against a pre-configured list of websites comprising the personal information;
   comparing the personal information from the website against a stored personal information blockchain with a personal information validator;
   generating a personal information alert on condition that a first incongruity arises from comparing the personal information from the website against the stored personal information blockchain;
   retrieving website personal privacy settings from the website and utilizing a personal privacy validator to compare the website personal privacy settings against a stored personal privacy settings blockchain;
   generating a privacy alert on condition that a second incongruity arises from comparing the web site personal privacy settings against the stored personal privacy settings blockchain;
   comparing the website personal privacy settings against a personal privacy regulations blockchain with a jurisdictional validator and generating a jurisdictional alert on condition that a third incongruity exists; and
   receiving at a privacy remediator the privacy alert, the personal information alert, and the jurisdictional alert, from the jurisdictional validator and the privacy auditor, and generating an ameliorative action for the personal information on the web site based on one or more of the alerts.

2. The method of claim 1 wherein the privacy auditor retrieves the website personal privacy settings via an application program interface (API).

3. The method of claim 1 wherein the ameliorative action further comprises an API call to the web site to correct the web site personal privacy settings.

4. The method of claim 1 wherein the ameliorative action further comprises generating and transmitting of a violation alert to the website's operator informing the website's operator of personal information or privacy violations.

5. The method of claim 1 wherein the personal information validator compares the personal information against a user-configured alert list and generates personal information alert on condition that compromising personal information is detected.

6. The method of claim 1 wherein the privacy auditor periodically scans a plurality of web sites and decentralized services from the pre-configured list of web sites for incorrect personal information and generates the ameliorative action.

7. The method of claim 1 wherein the privacy auditor configures a browser with a concept filter to perform the website scan.

8. The method of claim 1 wherein the privacy auditor is a web browser plugin.

9. The method of claim 1 wherein the privacy auditor is instantiated as a daemon.

10. The method of claim 1 wherein the privacy remediator configures the stored personal information blockchain to interface with a data marketplace.

11. The method of claim 10 wherein a value is generated and assigned to stored personal information in the stored personal information blockchain.

12. The method of claim 10 wherein compensation for transactions within the data marketplace are deposited in a digital wallet.

13. The method of claim 10 wherein transactions within the data marketplace are recorded on a transaction blockchain.

14. A non-transitory computer-readable medium comprising instructions that when applied to at least one processor of one or more computer system for execution by the computer system, result in:
   operating a content controller on a digital network gateway, the content controller responsive to signals from a plurality of authorization control modules, wherein the digital network gateway is responsive to a combined authorization signal generated from the signals from the authorization control modules;
   the digital network gateway gating personal information to a digital content distributor;
   the digital content distributor digitally distributing the personal information to the plurality of web sites, wherein the content distributor is configured to inhibit the distribution based on a signal from the content controller;
   receiving a navigation alert from a web browser with a privacy auditor that a web site has been navigated to, triggering a website scan;
   scanning the website for the personal information with the privacy auditor, and retrieving the personal information from the website and comparing the website against a pre-configured list of websites comprising the personal information;
   comparing the personal information from the website against a stored personal information blockchain with a personal information validator;
   generating a personal information alert on condition that a first incongruity arises from comparing the personal information from the website against the stored personal information blockchain;
   retrieving website personal privacy settings from the website and utilizing a personal privacy validator to compare the website personal privacy settings against a stored personal privacy settings blockchain;
   generating a privacy alert on condition that a second incongruity arises from comparing the website personal privacy settings against the stored personal privacy settings blockchain;
   comparing the website personal privacy settings against a personal privacy regulations blockchain with a jurisdictional validator and generating a jurisdictional alert on condition that a third incongruity exists; and receiving at a privacy remediator the privacy alert, the personal information alert, and the jurisdictional alert, from the jurisdictional validator and the privacy auditor, and generating an ameliorative action for the personal information on the website based on one or more of the alerts.

15. The non-transitory computer-readable medium of claim 14, further comprising instructions that when applied to the at least one processor result in:
the privacy auditor retrieving the website personal privacy settings via an application program interface (API).

16. The non-transitory computer-readable medium of claim 14, further comprising instructions that when applied to the at least one processor result in:
the ameliorative action comprising an API call to the website to correct the website personal privacy settings.

17. The non-transitory computer-readable medium of claim 14, further comprising instructions that when applied to the at least one processor result in:
the ameliorative action further comprising generating and transmitting of a violation alert to the website's operator informing the website's operator of personal information or privacy violations.

18. The non-transitory computer-readable medium of claim 14, further comprising instructions that when applied to the at least one processor result in:
the personal information validator comparing the personal information against a user-configured alert list and generating personal information alert on condition that compromising personal information is detected.

19. The non-transitory computer-readable medium of claim 14, further comprising instructions that when applied to the at least one processor result in:
the privacy auditor periodically scanning a plurality of web sites and decentralized services from the preconfigured list of web sites for incorrect personal information and generating the ameliorative action.

20. The non-transitory computer-readable medium of claim 14, further comprising instructions that when applied to the at least one processor result in:
the privacy auditor configuring a browser with a concept filter to perform the web site scan.

21. The non-transitory computer-readable medium of claim 14, further comprising instructions that when applied to the at least one processor result in:
the privacy auditor instantiated as a web browser plugin.

22. The non-transitory computer-readable medium of claim 14, further comprising instructions that when applied to the at least one processor result in:
the privacy auditor instantiated as a daemon.

23. The non-transitory computer-readable medium of claim 14, further comprising instructions that when applied to the at least one processor result in:
the privacy remediator configuring the stored personal information blockchain to interface with a data marketplace.

24. The non-transitory computer-readable medium of claim 23, further comprising instructions that when applied to the at least one processor result in:
generating and assigning a market value to the stored personal information in the stored personal information blockchain.

25. The non-transitory computer-readable medium of claim 23, further comprising instructions that when applied to the at least one processor result in:
depositing compensation for transactions within the data marketplace in a digital wallet.

26. The non-transitory computer-readable medium of claim 23, further comprising instructions that when applied to the at least one processor result in:
recording transactions within the data marketplace on a transaction blockchain.

* * * * *